(12) United States Patent
Mills (10) Patent No.: US 6,497,519 B1
(45) Date of Patent: Dec. 24, 2002

(54) COMPACT CAMERA WITH IMPROVED COLLAPSIBLE HOUSING

(76) Inventor: William B Mills, 65 E. Washington St. Apt. 4207, N. Attlebo, MA (US) 02760

( * ) Notice: Subject to any disclaimer, the term of this patent is extended or adjusted under 35 U.S.C. 154(b) by 0 days.

(21) Appl. No.: 09/912,033

(22) Filed: Jul. 24, 2001

(51) Int. Cl.⁷ .......................... G03B 5/02; G03B 17/04; G03B 29/00
(52) U.S. Cl. ........................ 396/349; 396/433; 396/535
(58) Field of Search ................................ 396/348, 349, 396/433, 535

(56) References Cited

U.S. PATENT DOCUMENTS

| | | | |
|---|---|---|---|
| 4,006,488 A | 2/1977 | Kuboshima | 396/341 |
| 4,106,039 A | 8/1978 | Fukuda | 396/350 |
| 4,213,685 A | 7/1980 | Koda | 396/346 |
| 4,241,986 A | 12/1980 | Thomson | 396/350 |
| 4,660,951 A | 4/1987 | Reed et al. | 396/33 |
| D296,109 S | 6/1988 | Peterson et al. | D16/211 |
| 5,027,142 A | 6/1991 | Douglas | 396/33 |
| 5,043,751 A * | 8/1991 | Rice | 396/349 |
| 5,546,147 A | 8/1996 | Baxter et al. | 396/349 |
| 5,708,877 A | 1/1998 | Pankhurst | 396/178 |
| 5,933,659 A * | 8/1999 | Glover et al. | 396/6 |
| 6,055,374 A | 4/2000 | Douglas | 396/30 |

* cited by examiner

*Primary Examiner*—David M. Gray
*Assistant Examiner*—Rochelle Blackman
(74) *Attorney, Agent, or Firm*—Barlow, Josephs & Holmes, Ltd.

(57) ABSTRACT

The collapsible camera includes a base panel with a segmented panel connected thereto. The base panel carries light sensitive media, such as photographic film, and includes a light exposure region. The segmented panel carries a lens thereon. One end of the segmented panel is anchored to one end edge of the base panel. The opposing end of the segmented panel is slidably connected to the base panel. Upon sliding of the movable end of the segmented panel toward the anchored end, the segmented panel is erected thus positioning the lens to the proper focal length from the light sensitive media in preparation for taking a picture. Light blocking material surrounds the region between the lens and the light sensitive media.

56 Claims, 11 Drawing Sheets

COMPACT CAMERA WITH IMPROVED COLLAPSIBLE HOUSING

BACKGROUND OF THE INVENTION

The present invention relates generally to a photographic camera. More specifically, the present invention relates to a collapsible housing for a compact card camera that is capable of using standard 35 mm photographic film.

The sale of photographic film and single-use pre-loaded cameras to amateur photographers is a major industry worldwide. The market for these products is almost entirely "event-driven" in that the consumer purchases the film or the single-use camera because they intend to take photographs at a pre-planned event, such as a birthday party, wedding, and the like. Individuals do not typically carry a camera at all times for the capture of "impulse" photographs of non-planned events due to the bulk and weight of current design cameras and film, which inhibits their "constant carry". As a result, the volume of film sold and developed is a fraction of its total potential usage. While extremely compact cameras have been developed and marketed in the past, such as the Minox-type cameras, the goal of these cameras was concealment, they still exhibited enough volume and weight so as to make them unsuitable for continuous carry, they were of expensive design, and importantly, they employed a specialized film which is not compatible with "fast-turnaround" one-hour film developing establishments geared for processing standard 35 mm film.

As can be understood, a camera includes a body housing that contains light sensitive media for capturing the image to be taken, as well as a lens for focusing the image to be taken on the light sensitive media. To achieve a properly focused picture for capturing an image, the lens must be positioned a certain distance away from the light sensitive media, otherwise known as the focal length. The positioning of the lens away from the light sensitive media is critical in ensuring that the picture is in focus. This is of particular concern when it is desirable for the overall size and shape of the camera to be very small. As a result, there is a need for the camera to be able to collapse for storage during periods of non-use. However, prior art compact cameras collapse in a fashion that is awkward and requires many moving parts, resulting in an expensive camera. Further, prior art cameras still remain so bulky so as to discourage "constant carry" for capture of "impulse" photographs.

Therefore, in view of the concerns discussed above, it would be desirable for a camera to be as compact as possible, such as in the configuration of a credit card for easy transport at all times. It is particularly desirable for such a compact camera to have a housing that can collapse quickly and easily to achieve a compact configuration during non-use of the camera. It is desirable for a camera to be quickly and easily set-up for use. It is also desirable for a credit card camera to be very inexpensive to manufacture to reduce the overall cost to the consumer. Further, is also desirable for a credit card camera to be easy to operate. It is further desirable for the film inside the credit card camera to be easy and inexpensive to develop while achieving high picture quality.

SUMMARY OF THE INVENTION

The present invention preserves the advantages of prior art cameras and prior art collapsible housings therefor. In addition, this camera provides new advantages not found in prior art cameras and their housing, and overcomes many of the disadvantages of such cameras and associated housing.

The invention is generally directed to a novel and unique compact card camera, that is typically credit card sized, with particular application in taking quality photographs using standard 35 mm film. The credit card camera of the present invention enables compact transport of a camera which is well-suited for emergency use, and the like. The credit card camera of the present invention has a unique collapsible housing that enables quick assembly and preparation of the camera for operation.

The preferred embodiment of the card camera of the present invention includes a base panel having a first end edge and a second end edge opposing said first end edge and a first side edge and a second side edge. A segmented panel has a number of segments hingedly connected to one another. The leading edge of the first segment is anchored proximal to the first end edge of the base panel. The trailing edge of the last segment is controllably movable along the base panel between the first end edge of the base panel and the second end edge of said base panel. The trailing edge of the last segment is temporarily fixable to the base panel at a selected distance from the leading edge of the first segment. A portion of the base panel under the assemblage of top segments defining a light exposure region. A lens is disposed in one of the segments between the first segment and the last segment and positioned above the light exposure region. Light blocking material extends from the lens holding segment to the portion of the base panel about the light blocking region. The segments are movable from a position substantially parallel to the base panel to an erected condition over the film exposure region with the lens disposed thereabove in preparation for exposure of film positionable in the film exposure region.

Also, a shutter preferably controls the light imparted to the light-sensitive medium. The light-sensitive medium is exposed to a scene through the lens. The light-sensitive medium may be separate individually stacked photographic film frames, a fan folded photographic film strip, individual film frames residing on a film carrier web, or compact roll of film. When individual frames are used, for example, they may be assembled into a continuous strip configuration for development using standard photographic equipment.

The card camera as originally packaged, for example, at the point of purchase, is in a compact configuration substantially equal to the size and configuration of a standard credit card. To take a picture, the camera is first assembled and then is aimed at the subject scene and the shutter is actuated by depressing a button at the top of the camera. The film is then advanced in accordance with the particular film transport employed. After all of the film is exposed, the camera, or a removable film cartridge, can be sent to a standard photographic film service for developing. The camera may be returned to a collapsed state for this purpose. Depending on the film transport employed, the film will be prepared accordingly so that it may be accommodated by a standard film developing service. Such preparation for film developing will be discussed in more detail below.

It is the intent of the present invention to provide a camera that is of a shape, size, weight, and design so as to encourage constant and convenient carry by photographers for the capture of impulse as well as pre-planned photographs. It is further the intent to produce a credit card shaped "card camera" which may be constantly carried in an ordinary wallet, or on a key chain, for example, for extended periods of time. Additionally, the present invention permits the compact camera to use common 35 mm or APS film compatible with development at "fast turnaround" one-hour film development establishments. It is further the intention of the present invention to enable extremely low-cost manufacture of the camera through the employment of die-cut camera components, and "built-up" laminate sheet construction techniques, or injection molding, to achieve a lower camera price for higher sales. Most importantly, the present invention provides a new and unique collapsible housing to enable the camera to quickly and easily be significantly reduced in size to permit the convenient portability as described above. Such a flat, lightweight camera design will also make mailing a single-use version to a development facility easier and less expensive, as well as make it easier to package the camera with other consumer goods as a promotion.

It is therefore an object of the present invention to provide a credit card camera that is lightweight and compact and of a configuration similar to that of a standard credit card.

An additional object of the present invention is to provide a camera that is inexpensive to manufacture.

Another object of the present invention is to provide a credit card camera that employs standard 35 mm or APS film.

It is an object of the present invention to provide a credit card camera that may be stored in a compact state yet is easily assembled in preparation for use.

It is a further object of the present invention to provide a credit card camera that is lightweight and compact to facilitate carry at all times for emergency and impulse photography.

It is yet a further object of the present invention to provide a credit card camera that is suitable for carrying in a wallet, or the like.

It is another object of the present invention to provide a credit card camera that is easy to use.

It is a further object of the present invention to provide a credit card camera that functions similar to a common and familiar "point and shoot" camera.

It is an object of the present invention to provide a simple, collapsible structure, capable of self-bracing, to maintain proper focal length in a compact camera.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
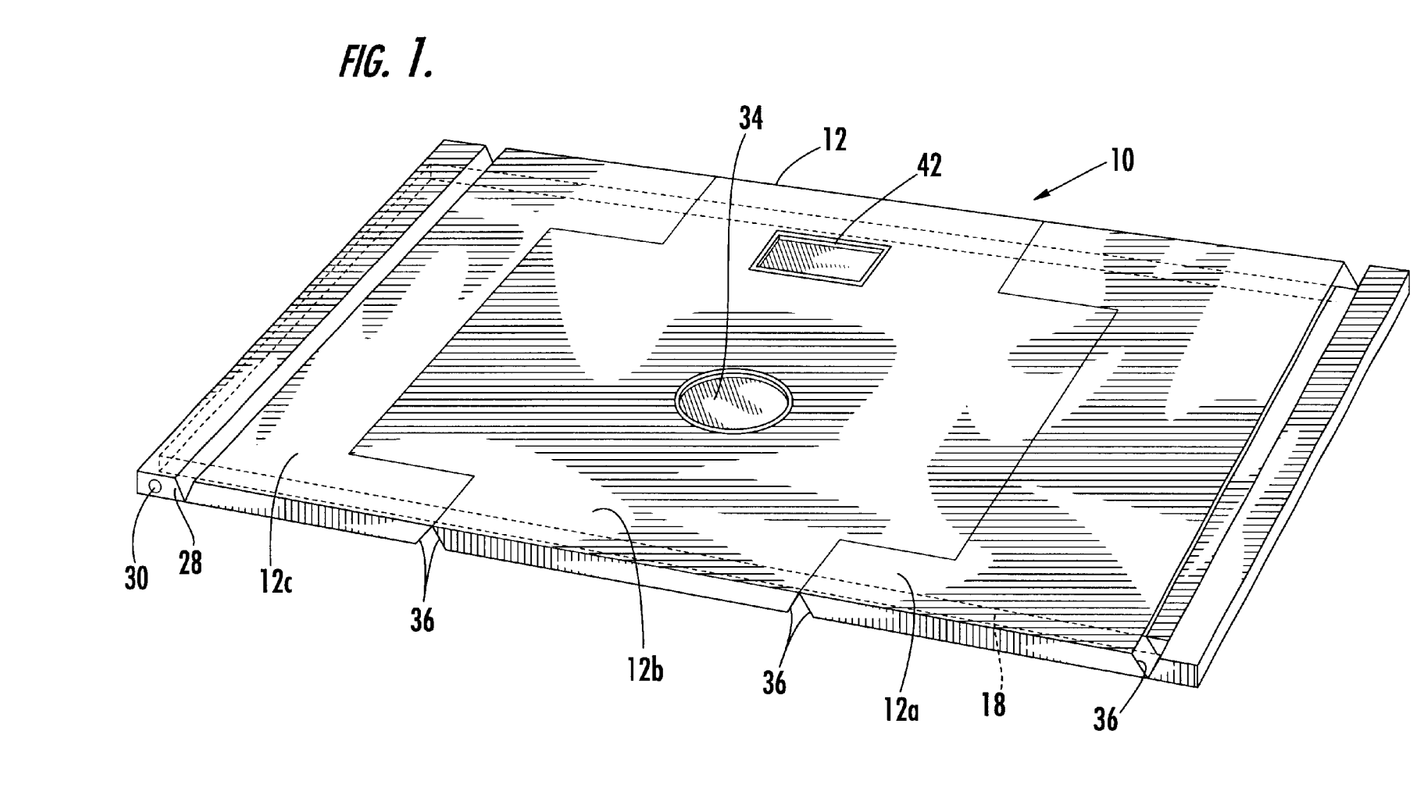
FIG. 1 is a front perspective view of the collapsible camera housing in a completely collapsed state ready for storage.

Referring first to FIG. 1, the general configuration prior to use of the credit card camera 10 of the present invention is shown The credit card camera 10 is preferably packaged as shown in FIG. 1 which is generally of a size and configuration of a standard credit card. Shrink wrapping, labels, or the like may be employed to seal the camera 10 for point of purchase sale. This configuration is about 2.125 inches wide, about 3.375 inches long and about 0.135 inches thick. While this is a preferred configuration, other configurations may be employed and still be within the scope of the present invention. This packaged configuration is for shipping, storage and transport of the camera 10. For example, the compact configuration of the camera 10 makes it well-suited for storage in a user's wallet (not shown). As a result of this size and configuration, the camera 10 may be a "constant carry" item so that it will be available for use at all times for emergencies, unplanned events, and the like. The credit card camera 10 in the packaged form in FIG. 1 may, for example, be sold as a standalone unit or may be easily sold in a blister card for ease of point of purchase sale.

Figure 2:
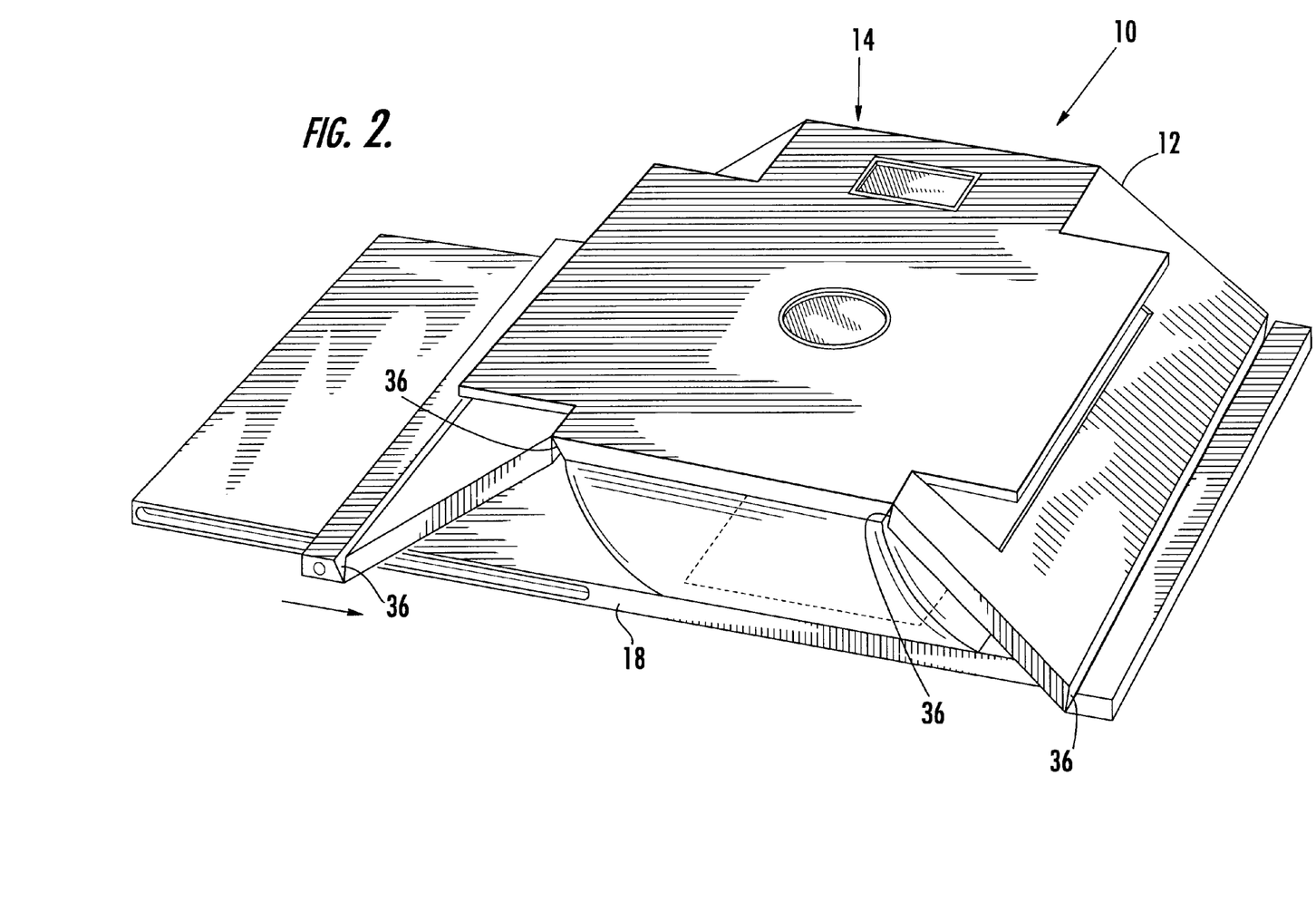
FIG. 2 is a front perspective view of the collapsible camera housing of FIG. 1 in the process of being assembled for use.
Figure 3:
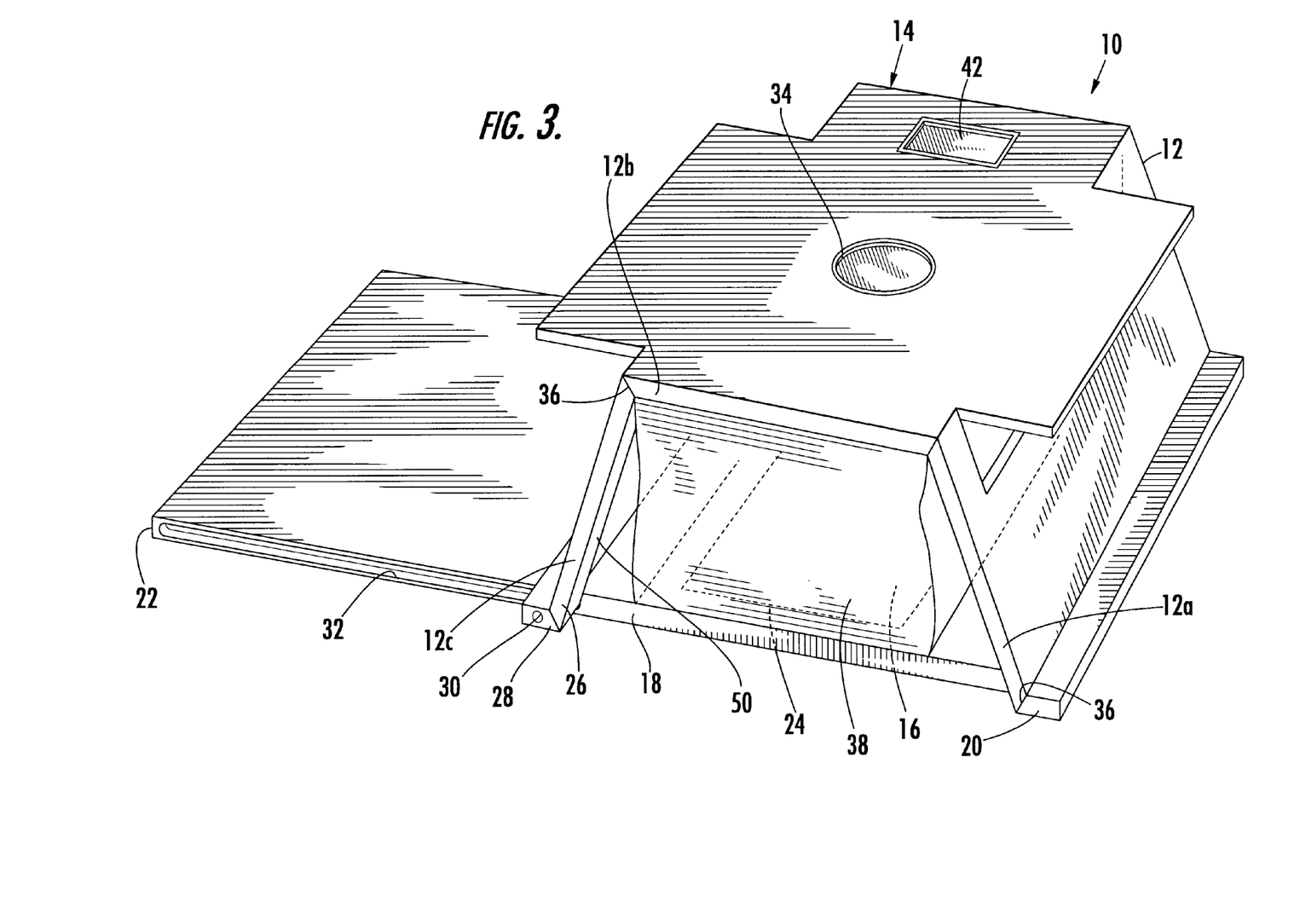
FIG. 3 is a front perspective view of the collapsible camera housing of the present invention in an assembled state ready for use.
Figure 4:
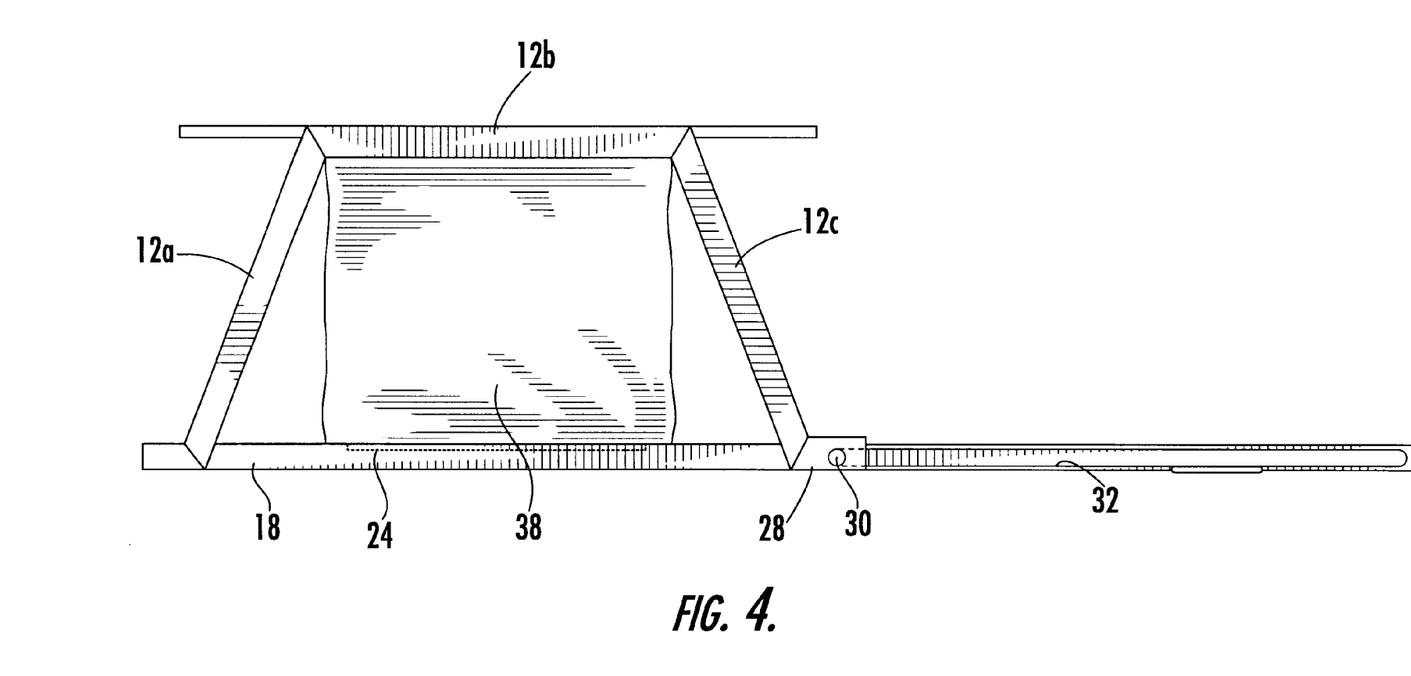
FIG. 4 is a top view of the collapsible camera housing of FIG. 1.
Figure 5:
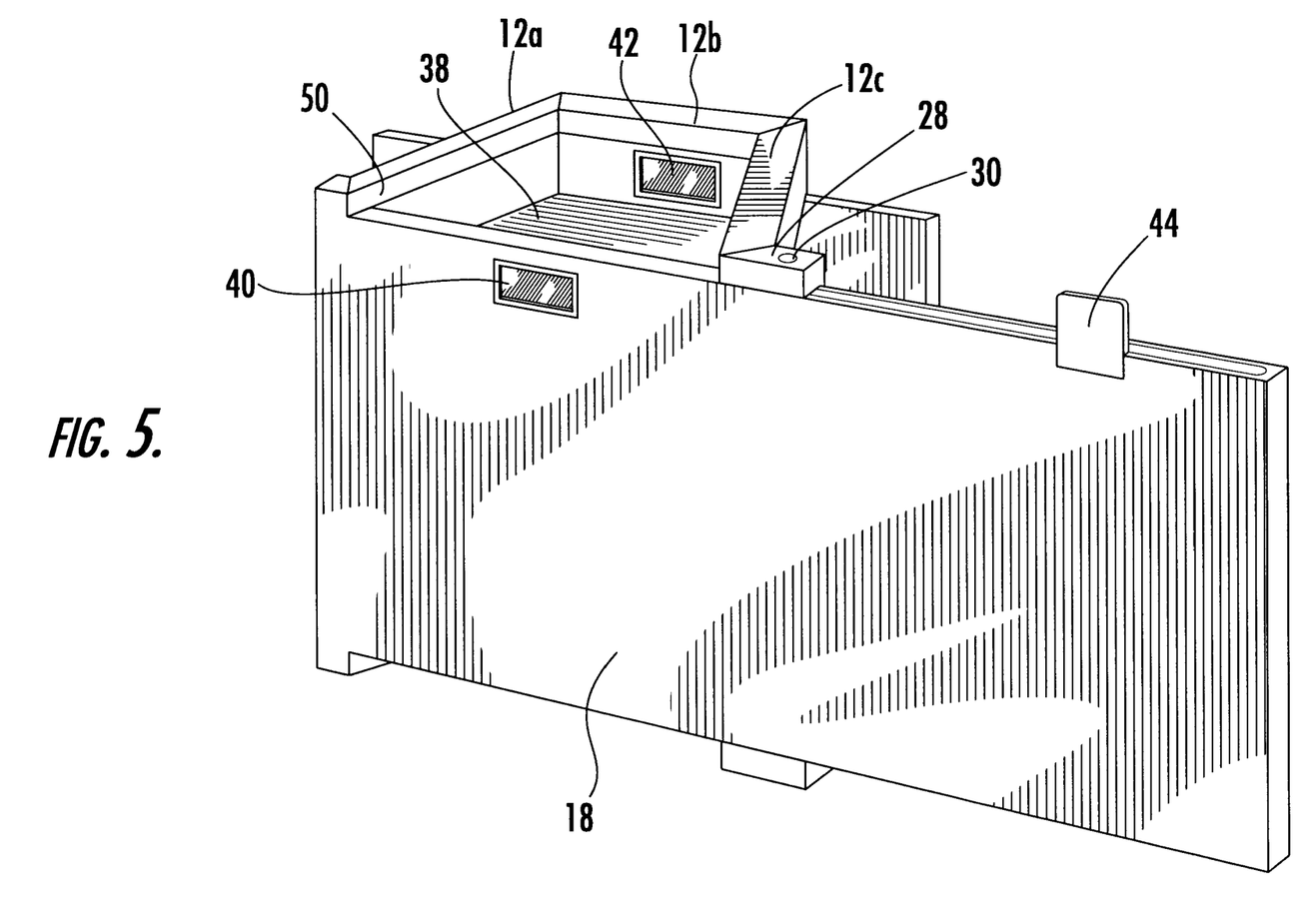
FIG. 5 is a rear elevational view of the collapsible camera housing of FIG. 1.

Turning now to FIGS. 2–5, in addition to FIG. 1, the compact credit card camera 10 includes an improved collapsible housing which enables it to be significantly reduced in size for increased portability and convenience. While FIG. 1 illustrates the camera 10 in a collapsed state, FIG. 2 shows the camera 10 in the process of being assembled. Further, FIG. 3 shows the camera 10 in a fully assembled condition in preparation for use. FIG. 4 shows a top view of the fully assembled camera 10 of the present invention while FIG. 5 shows a rear perspective view of the camera 10 in preparation for use.

In accordance with the present invention, a slidable segmented panel 12 is employed to provide an enclosed light blocking frame, generally referred to as 14, for not only protecting the light sensitive media 16 against accidental exposure but also to provide the camera 10 with the required lens focal length and structural integrity for taking high quality pictures.

The camera 10 includes a base panel 18 with a first end 20 and a second end 22. A light exposure region 24 is positioned in the base panel 18 which houses light sensitive media 16, such as photographic film. The photographic film may be a single frame of film for a single shot camera or multiple frames for a multiple shot camera. The film is stored in the base panel, or in a cartridge on or in the base panel, and may, in the situation of a multiple shot camera, be moved within the base panel by a film transport system. Details of such film transport mechanisms and devices (not shown) need not be discussed in detail as they are well known in the prior art. Alternatively, a digital image capture device and associated electronics, such as a CCD, may be employed as the light sensitive media 16 in light exposure region 24. Regardless of the type or method of image capture, the requisite lens focal length must be achieved while maintaining the camera 10 in a small form factor.

As best seen in FIGS. 1–3, the light blocking frame 14 is erected directly over the light exposure region 24 of the base panel 18 which is housing the light sensitive media 16 therein. The segmented panel 12 preferably has three segments 12a, 12b and 12c, however, more or less segments may be employed as desired and still be within the scope of the present invention. The segmented panels 12a–c are hingedly connected to one another with the end of the first segment 12a being anchored to the base panel 18 at its first end 20. The opposing free end 26 of the segmented panel is connected to a sliding member 28 which is slidable along a set length of the base panel 18. In FIGS. 1–5, the sliding member 28 connected to the free end 26 of segmented panel 12c includes a pair of inwardly facing pins 30 that engage with a groove 32 running along a length of each opposing side edge of the base panel 18. As a result, the free end 26 of the segmented panel 12c, via sliding member 28, can freely slide along the length of the base panel 18. FIG. 2 illustrates the sliding action of the free end 26 of the segmented panel 12c with pins 30 slidably residing in the groove 32 in the edge of the base panel 18. As a result, all of the panels 12a–c slide since segment 12a is hingedly anchored to the base panel 18.

Further sliding of the free end 26 of the segmented panel 12 toward the anchored segmented panel 12a of the segmented panel 12 causes the light blocking frame 14 to be erected over the light exposure region 24 carrying the light sensitive media 16. FIG. 3 illustrates the camera 10 of the present invention in a fully assembled state in preparation for use. When the pair of pins 30 slide as far as they can in the groove, the light blocking frame 14 is fully erected thus positioning a lens 34 in one of the segments 12a, 12b or 12c, preferably the middle segment 12b, the appropriate distance away to achieve the proper focal length for the lens 34 to achieve a quality, focused image on the light sensitive media 16. An additional detent or seat (not shown) may be provided in the grooves 32 to receive the pair of pins 30 to temporarily secure the pins 30 in place to maintain the light blocking frame in its proper erected form during use of the camera 10.

Further, each of the segments 12a–c in the segmented panel 12 preferably include complementary beveled edges 36 to respectively serve as stops to indicate when the light blocking frame 14 is fully erected and to further reinforce the frame 14 when fully erected. Each of the segments 12a–c preferably has a support beam 50 running along each side, with a height typically equivalent to the height of the camera 10 in a flattened state. Such support beams 50 permit the center areas of segments 12a–c to be of varying thicknesses, including extremely thin, permitting clearance and space for shutter mechanisms, flash mechanisms, release mechanisms, and the like, while still maintaining the structural integrity of the framework when camera 10 is assembled for use. Other structures, such as fingers and grooves (not shown), may also be employed to serve to reinforce the erected structure 14.

It should also be understood that the segmented panel 12 may alternatively include a flexible yet resilient material as opposed to separate discrete segments 12a–c as shown in FIGS. 1–5. For example a plastic material (not shown) may be employed in similar fashion to the segmented panel 12 to serve as a panel that can be erected to form the aforementioned light blocking frame 14 to contain and protect the light sensitive media 16 in the light exposure region 24 of the camera 10. Similarly, the plastic material is anchored to one end of the base panel 18 and the free end of the plastic material is movable along the length of the base panel to form a bowed light blocking frame for protecting the light exposure region 24. Such alternative configurations are within the scope of the present invention.

The light blocking frame 14 provides a framework about the light exposure region 24 of the camera 10. Additional material is provided for actually preventing light from entering the light exposure region 24 and onto the light sensitive media 16 therein. Additional light-blocking material 38 is preferably tubular in configuration and extends from a portion of the segmented panel 12, such as the center panel 12b, to the base panel 18 about the light exposure region 24. The light blocking material 38 is made of any known type of light blocking material, such as Tyvek, vinyl, plastic, paper, or the like. As a result, a flexible light blocking curtain 38 is provided between the segmented panel 12 and the base panel 18. When in a collapsed state, the light blocking curtain 38 is collapsed and folded on its side. Upon erection of the light blocking frame 14, the light blocking curtain 38 is gradually raised, as shown in FIG. 2, because it is attached to the segmented panel 12 which is moving toward the right. Once the segmented panel 12 is fully erected, as shown in FIGS. 3 and 4, the light blocking curtain 38 is fully assembled to form a column of light protected space suitable for the controlled exposure of light sensitive media 16, such as photographic film. The flexibility of the light blocking curtain 38 permits the unrestricted assembly and collapsing of the segmented panel 12. The light blocking curtain 38 is preferably square tubular in configuration but it also may be circular tubular or other configurations.

Once the camera 10 is fully assembled with the light blocking frame 14 fully erected and light blocking curtain 38 in place, the camera 10 is ready for capturing an image. As shown in FIG. 5, the camera 10 is fully assembled. A viewfinder lens 40 is provided in the base panel 18 while a pass through viewfinder lens 42 is also provided in alignment therewith through one of the segments 12a, 12b or 12c of the segmented panel, such as the center panel 12b. To capture a picture, the scene is framed in the 9 viewfinders 40, 42 and the shutter activation button 44 is depressed to release the shutter to open (not shown) in the camera 10 to allow light to enter the space in the light blocking curtain 38 of the camera 10 to expose the light sensitive media 16 in the light exposure region 24 of the base panel 18. During use, it is preferred that the user hold the camera 10 by the base panel 18 in similar fashion to holding a card, as opposed to squeezing both the segmented panel 12 and base panel 18 together, to avoid altering the focal length of the lens 34 and thus disturbing the focused image on the light sensitive media 16. If a single shot camera, the film in camera 10 is now ready for development. In a multiple photograph embodiment camera 10, the film is advanced to the next frame in preparation for capturing of the next scene.

Details of the construction of the shutter activation button 44, the shutter mechanism itself and the film transport of light sensitive media 16 are not set forth herein as they are well known in the prior art. The construction of the camera 10 of the present invention may accommodate any suitable shutter mechanism and film transport and still be within the scope of the present invention. For example, the camera 10 of the present invention can accommodate a wide array of shutter mechanisms and film transport types. For example, the camera 10 can accommodate single frames of film as well as multiple frames of film that move from the light exposure region 24 to a storage region or vice versa. Such multiple frames of film can be individual stacked frames of film or fanfolded frames or roll-type film. The film transport type can be easily selected and used in accordance with the desired use of the camera 10.

Figure 6:
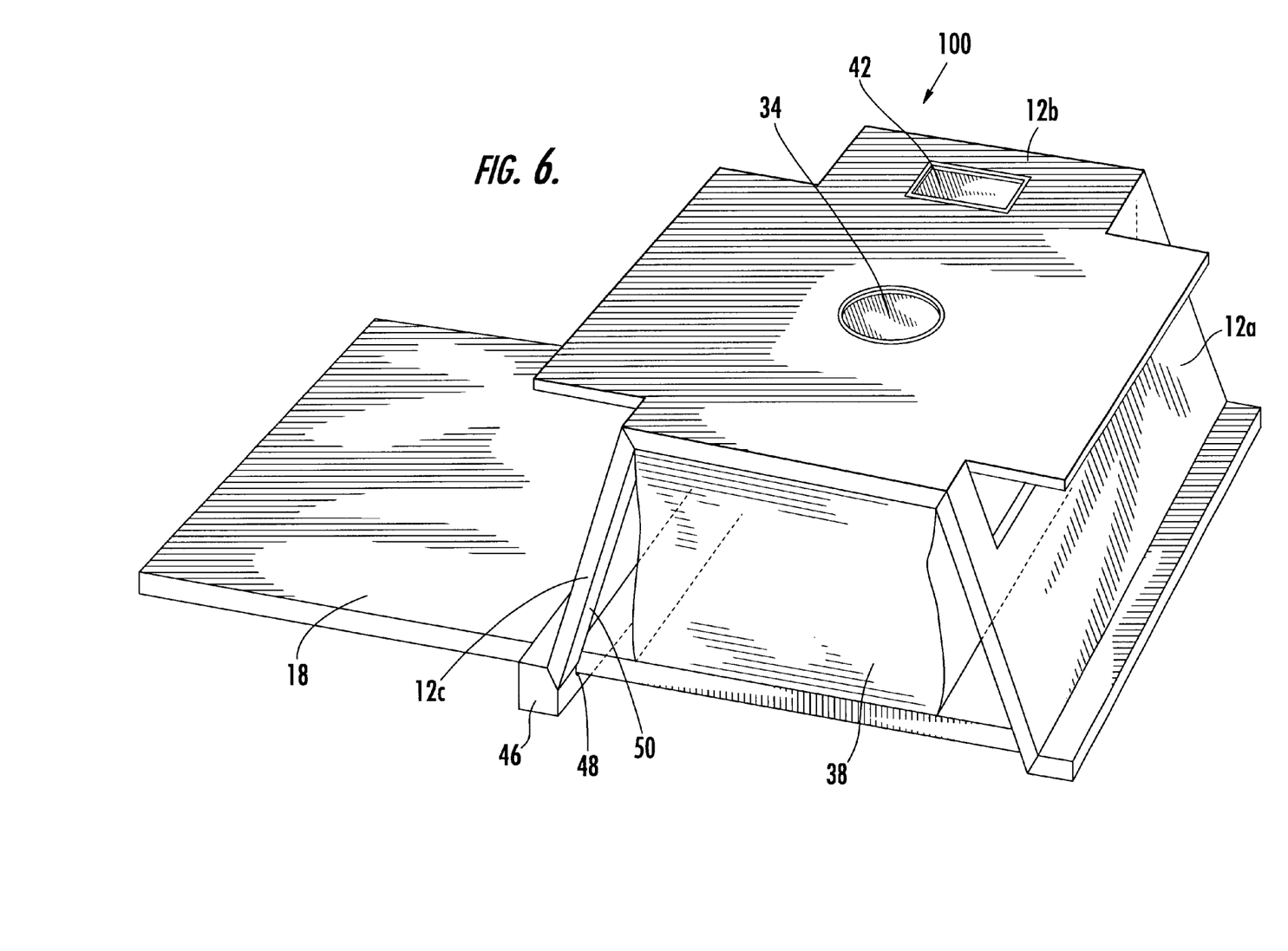
FIG. 6 is a front perspective view of an alternative embodiment of the collapsible camera housing in accordance with the present invention.
Figure 7:
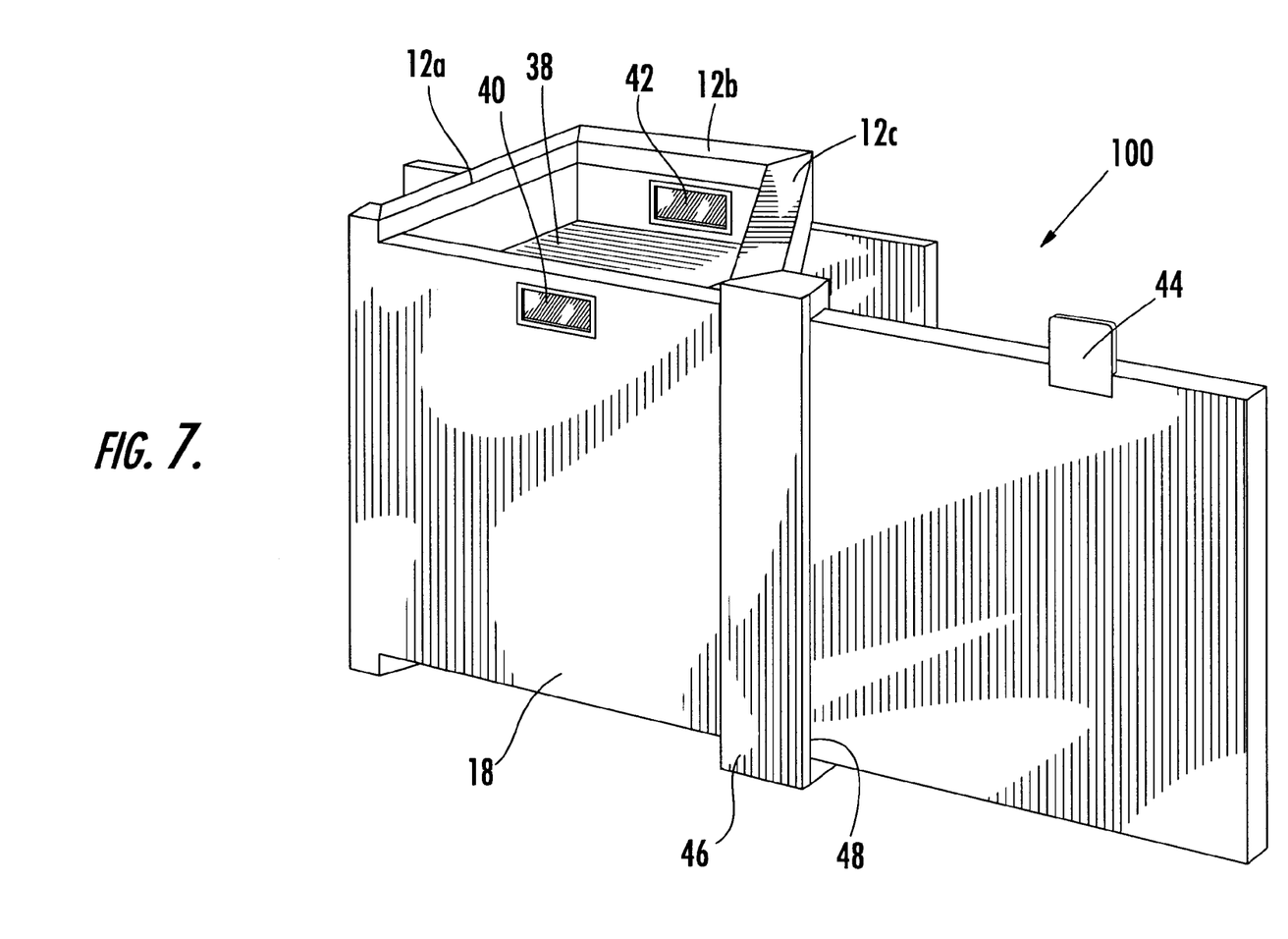
FIG. 7 is a rear elevational view of the alternative embodiment of the collapsible camera housing shown in FIG. 6.

Turning now to FIGS. 6 and 7, another embodiment 100 of the present invention is shown. The configuration of the alternative embodiment 100 is identical to that of the preferred embodiment shown in FIGS. 1–5 with the exception of the structure employed for slidably connecting panel 12c to the base panel 18. Instead of using a pair of pins 30 that slide within grooves 32 in the base panel 18, a sliding member 46 is hingedly connected to panel 12c and is provided with a transverse groove 48 that embraces the width of the base panel 18. The transverse groove 48 of the sliding member 46 may be dimensioned to be slightly smaller than the cross-sectional dimensions of the base panel 18 to provide a friction fit of the sliding member 46 to the base panel 18. The free end of the segmented panel 12c, via sliding member 46, freely rides, under slight friction, along the base panel 18. The sliding member 46 is pushed as far as possible toward the anchored end of the segmented panel via panel 12a, such travel being limited and controlled by the beveled edges 36 of the hingedly connected segments 12a–c of the segmented panel 12 in the same fashion as the embodiment shown in FIGS. 1–5. An additional detent or seat (not shown) may be provided on the side of the edges of base panel 18 to receive the pair of transverse grooves 48 on the sliding member 46 to temporarily secure the transverse grooves 48 in place to maintain the light blocking frame 14 in its proper erected form during use of the camera 10. As a result, the light blocking frame 14 over the light exposure region 24 can be quickly and easily formed to prepare the camera 10 for use.

Figure 8:
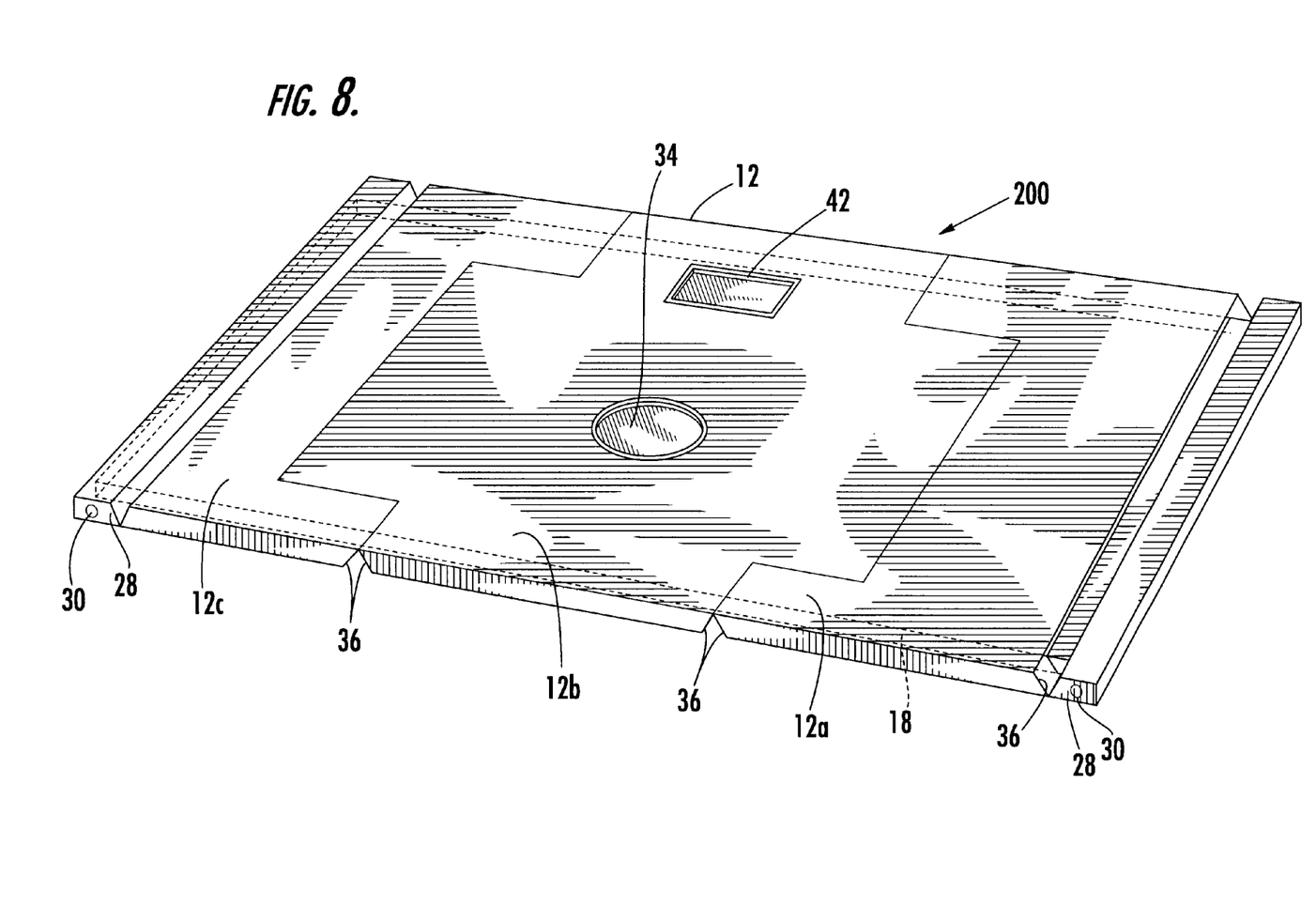
FIG. 8 is a front perspective view of another alternative embodiment of the collapsible camera housing of the present invention.
Figure 9:
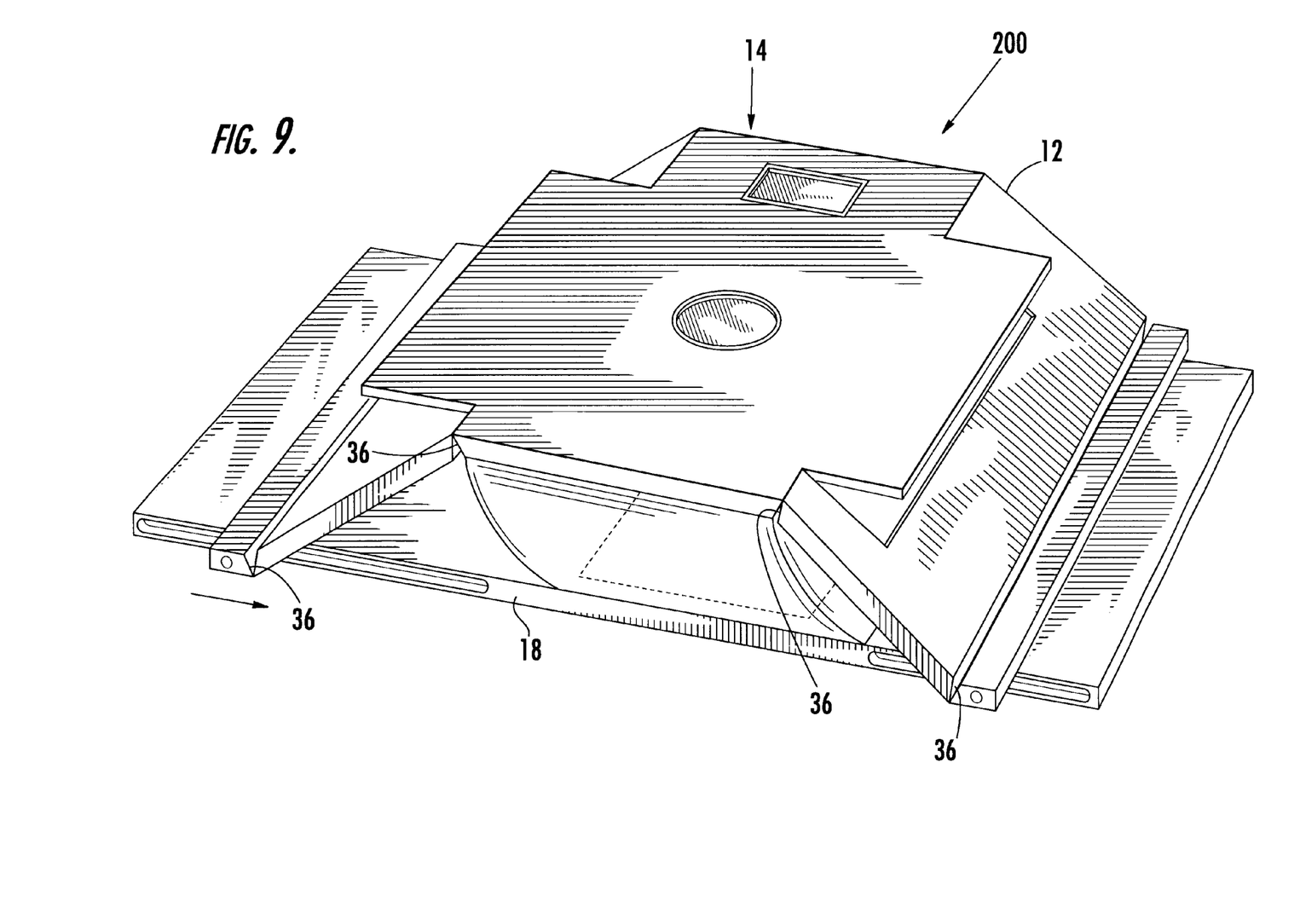
FIG. 9 is a front perspective view of the embodiment of FIG. 8 in the process of being assembled.
Figure 10:
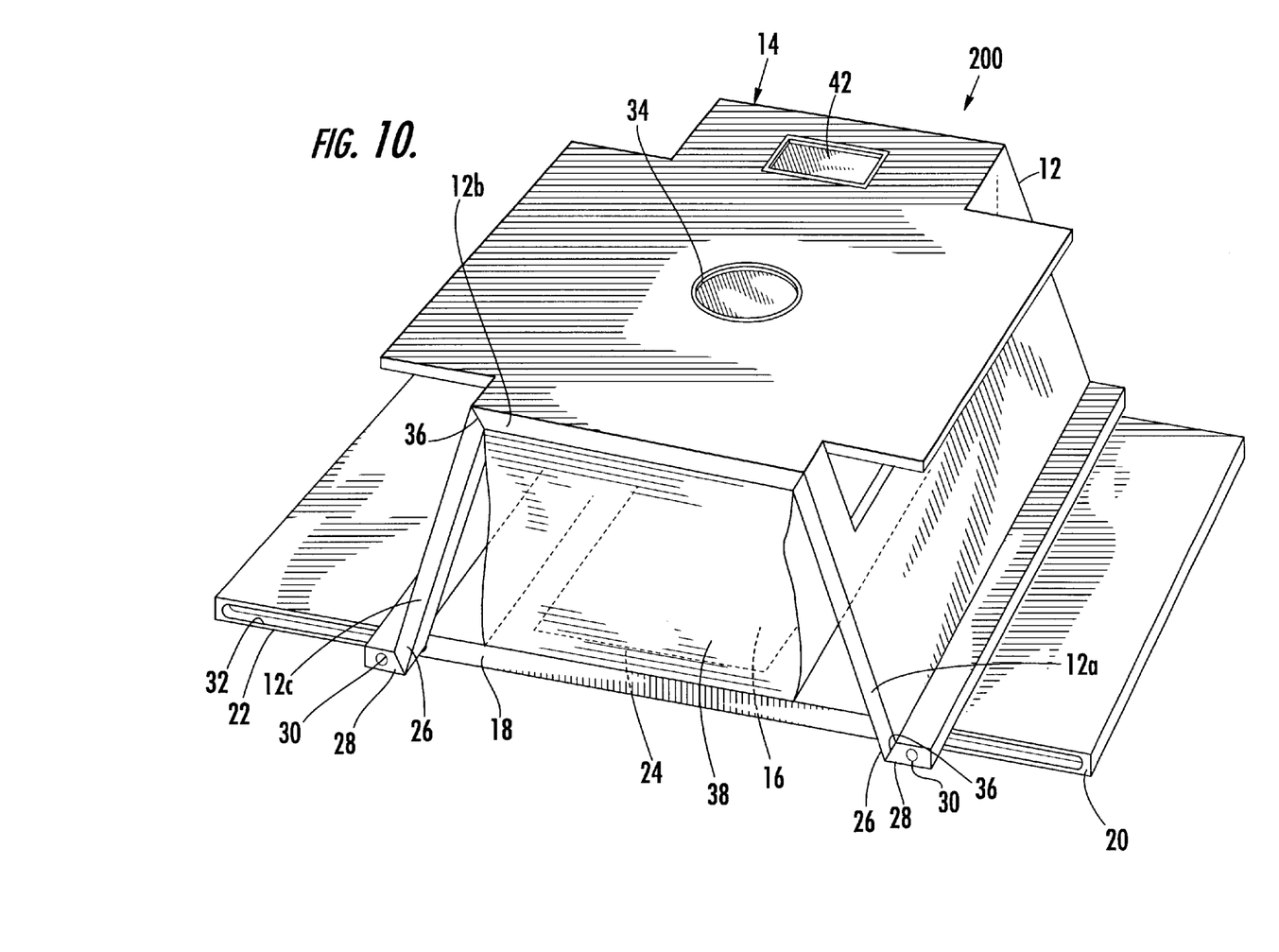
FIG. 10 is a front perspective view of the embodiment of FIG. 8 in an assembled state ready for use.

In FIGS. 8, 9, and 10 yet another embodiment 200 of the present invention is shown. The configuration of the alternative embodiment 200 is identical to that of the preferred embodiment shown in FIGS. 1–5 with the exception of the structure employed for connecting panel 12a to the base panel 18. Instead of panel segment 12a being hingedly anchored to the base panel 18, it is slidably connected to base panel 18 the same as panel 12c. Referring to FIGS. 8, 9, and 10, the free end 26 of panel 12a is connected to a sliding member 28 which includes a pair of inwardly facing pins 30 which engage in a groove 32 running along a length of the edges of the base panel 18. As a result, the free end 26 of the segmented panel 12a, via sliding member 28, can freely slide along the length of the base panel 18 like panel 12c and its associated sliding member 28 and inwardly facing pins 30. Additional detents or seats (not shown) may be provided on the side edges of the base panel 18 to receive the inwardly facing pins 30 of the sliding members 28 to temporarily secure sliding members 28 in place to maintain the light blocking frame 14 in its proper assembled form during use of the camera 10.

Figure 11:
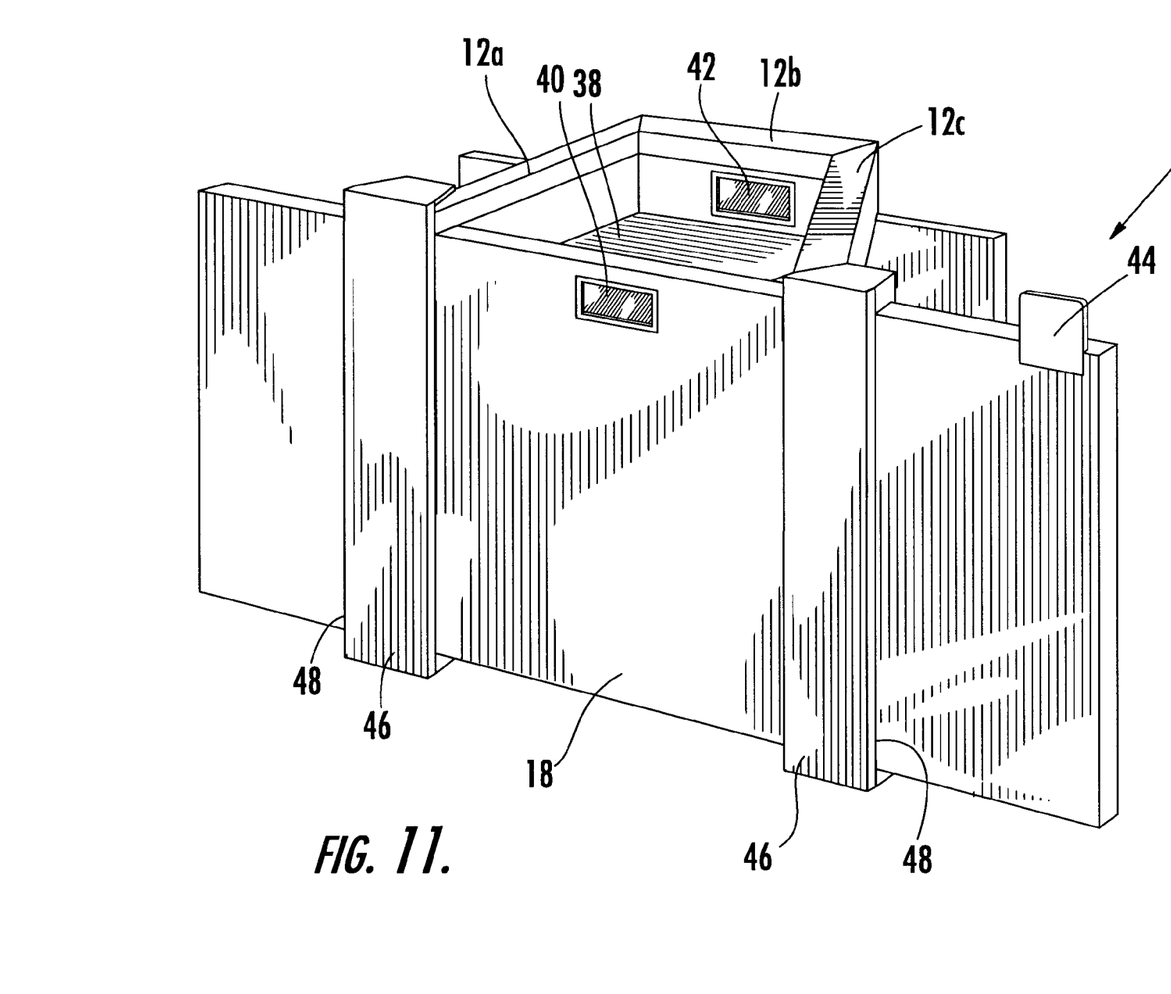
FIG. 11 is a rear perspective view of another embodiment of the present invention.

Referring to FIG. 11, yet another embodiment 300 of the present invention is shown. The configuration of the alternative embodiment 300 is identical to that of the embodiment shown in FIGS. 8–10 with the exception of the structure employed for connecting panels 12a and 12c to the base panel 18. Instead of panel segments 12a and 12c being slidably connected to base panel 18 by means of sliding members 28 each with associated pair of inwardly facing pins 30 which engage in grooves 32 running along lengths of the edge of the base panel 18, a sliding member 46 is hingedly connected to each of panels 12a and 12c, each sliding member 46 being provided with a transverse groove 48 that embraces the width of the base panel 18. The transverse groove 48 of sliding members 46 may be dimensioned to be slightly smaller than the cross-sectional dimensions of the base panel 18 to provide a friction fit of the sliding members 46 to the base panel 18. The free ends of the segmented panels 12a and 12c, via sliding members 46, freely ride, under slight friction, along the base panel 18. During assembly of camera 10 for use, each sliding member 46 is pushed as far as possible toward the opposing sliding member 46, such travel being limited and controlled by the beveled edges 36 of the hingedly connected segments 12a–c of the segmented panel 12 in the same fashion as the embodiment shown in FIGS. 8–10. Additional detents or seats (not shown) may be provided on the side edges of the base panel 18 to receive the pair of transverse grooves 48 of the sliding member 46 to temporarily secure the transverse grooves 48 in place to maintain the light blocking frame 14 in its proper assembled form during use of the camera 10.

It should also be understood that since the camera 10 is of a rectangular configuration, a linear sliding of the segmented panel 12 is preferred. If a different body configuration is used instead of one that is rectangular, the sliding motion of the segmented panel 12 may be modified accordingly. Similarly it should be understood that while the preferred embodiment of the present invention illustrates inwardly facing pins 30 residing within a groove 32, outwardly facing pins 30 may be provided to engage with an interior groove 32, or the like to achieve the sliding motion of the segmented panel 12 in accordance with the present invention. The configuration of the camera 10 of the present invention may be adapted for use in a digital camera embodiment with the use of solid state imaging components, such as CCD and CMOS cameras, and the like.

It should be understood that the foregoing shutter and lens mechanism for a camera 10 is shown by way of example. Various other well-known and commercially available camera mechanisms may be used to effectively introduce light into the camera 10 of the present invention. For example, various button and shutter mechanisms can be used that are conducive to use in the compact camera 10 of the type disclosed herein. The button may be connected to the shutter by a wire or line mechanism, for example, to permit the positioning of the shutter button in the desired location on the body of the camera 10 while still being mechanically connected to the shutter mechanism proximal to the lens 34 to enable proper control over the exposure of the light sensitive media 16. Similarly, while the embodiment disclosed illustrates a camera 10 with viewfinder mounted directly on the segmented panel 12, the viewfinder lens may also be entirely mounted on the base panel 18 itself.

It will be appreciated by those skilled in the art that various changes and modifications can be made to the illustrated embodiments without departing from the spirit of the present invention. All such modifications and changes are intended to be covered by the appended claims.

What is claimed is:

1. A collapsible camera, comprising:
   a base panel having a first end edge and a second end edge opposing said first end edge and a first side edge and a second side edge;
   a segmented panel having a plurality of segments hingedly connected to one another; said plurality of segments including a first segment with a leading edge and a last segment with a trailing edge; said leading edge of said first segment being anchored proximal to said first end edge of said base panel; said trailing edge of said last segment being controllably movable along said base panel between said first end edge of said base panel and said second end edge of said base panel;

said trailing edge of said last segment being temporarily fixable to said base panel at a selected distance from said leading edge of said first segment; a portion of said base panel under said plurality of segments defining a light exposure region;

a lens disposed in one of said plurality of segments defined as a lens segment between said first segment and said last segment and positioned above said light exposure region;

light blocking material extending from said lens segment to said portion of said base panel about said light blocking region; and whereby said plurality of segments are movable from a position substantially parallel to said base panel to an erected condition over said film exposure region with said lens disposed thereabove in preparation for exposure of film positionable in said film exposure region.

2. The collapsible camera of claim 1, further comprising:

a pair of inwardly directed pins respectively connected to opposing sides of said trailing edge of said last segment;

said first side edge and said second side edge respectively defining opposing longitudinal grooves running along respective portions thereof; said pair of pins respectively slidably residing in said longitudinal grooves.

3. The collapsible camera of claim 1, further comprising:

attachment means for slidably engaging said first side edge and said second side edge of said base panel; and said trailing edge of said last segment being connected to said attachment means.

4. The collapsible camera of claim 3, wherein said attachment means is a transverse member having a transverse slot therethrough; said base panel slidably residing in said transverse slot.

5. The collapsible camera of claim 1, further comprising:

a first viewfinder aperture disposed through said lens segment; and a second viewfinder aperture disposed through said base panel and being substantially alignable with said first viewfinder aperture.

6. The collapsible camera of claim 1, further comprising:

means for controllably introducing light through said lens and into contact with said light exposure region.

7. The collapsible camera of claim 6, wherein said means for controllably introducing light is a shutter mechanism between a scene to be photographed and said light exposure region.

8. The collapsible camera of claim 1, wherein said light blocking material is tubular in configuration.

9. The collapsible camera of claim 1, further comprising:

a light sensitive medium disposed on said light exposure region.

10. The collapsible camera of claim 9, wherein said light sensitive medium is photographic film.

11. The collapsible camera of claim 9, wherein said light sensitive medium is a digital image capture device.

12. The collapsible camera of claim 1, wherein said collapsible camera is substantially the size of a credit card when said trailing edge of said last segment is positioned proximal to said second end edge of said base panel.

13. The collapsible camera of claim 10, wherein said photographic film is 35 mm film.

14. The collapsible camera of claim 10, wherein said photographic film is an individual frame of film.

15. A collapsible camera, comprising:

a base panel having a first end edge and a second end edge opposing said first end edge and a first side edge and a second side edge;

a flexible panel having a leading edge and a trailing edge; said leading edge of said flexible panel being anchored proximal to said first end edge of said base panel; said trailing edge of said flexible panel being controllably movable along said base panel between said first end edge of said base panel and said second end edge of said base panel;

said trailing edge of said flexible panel being temporarily fixable to said base panel at a selected distance from said leading edge of said flexible panel; a portion of said base panel under said flexible panel defining a light exposure region;

a lens disposed in said flexible panel;

light blocking material extending from said flexible panel to said portion of said base panel about said light blocking region; and whereby said flexible panel is movable from a position substantially parallel to said base panel to an erected condition over said film exposure region with said lens disposed thereabove in preparation for exposure of film positionable in said film exposure region.

16. The collapsible camera of claim 15, wherein said flexible panel is made of plastic.

17. The collapsible camera of claim 15, further comprising:

attachment means for slidably engaging said first side edge and said second side edge of said base panel; and said trailing edge of said flexible panel being connected to said attachment means.

18. The collapsible camera of claim 17, wherein said attachment means is a transverse member having a transverse slot therethrough; said base panel slidably residing in said transverse slot.

19. The collapsible camera of claim 15, further comprising:

a first viewfinder aperture disposed through said flexible panel; and a second viewfinder aperture disposed through said base panel and being substantially alignable with said first viewfinder aperture.

20. The collapsible camera of claim 15, further comprising:

means for controllably introducing light through said lens and into contact with said light exposure region.

21. The collapsible camera of claim 20, wherein said means for controllably introducing light is a shutter mechanism between a scene to be photographed and said light exposure region.

22. The collapsible camera of claim 15, wherein said light blocking material is tubular in configuration.

23. The collapsible camera of claim 15, further comprising:

a light sensitive medium disposed on said light exposure region.

24. The collapsible camera of claim 23, wherein said light sensitive medium is photographic film.

25. The collapsible camera of claim 23, wherein said light sensitive medium is a digital image capture device.

26. The collapsible camera of claim 15, wherein said collapsible camera is substantially the size of a credit card when said trailing edge of said flexible panel is positioned proximal to said second end edge of said base panel.

27. The collapsible camera of claim 24, wherein said photographic film is 35 mm film.

28. The collapsible camera of claim 24, wherein said photographic film is an individual frame of film.

29. A collapsible camera, comprising:

a base panel having a first end edge and a second end edge opposing said first end edge and a first side edge and a second side edge;

a segmented panel having a plurality of segments hingedly connected to one another; said plurality of segments including a first segment with a leading edge and a last segment with a trailing edge; said leading edge of said first segment being controllably movable along said base panel between said first end edge of said base panel and said second end edge of said base panel; said trailing edge of said last segment being controllably movable along said base panel between said first end edge of said base panel and said second end edge of said base panel;

said leading edge of said first segment being temporarily fixable to said base panel at a selected distance from said trailing edge of said last segment; said trailing edge of said last segment being temporarily fixable to said base panel at a selected distance from said leading edge of said first segment; a portion of said base panel under said plurality of segments defining a light exposure region;

a lens disposed in one of said plurality of segments defined as a lens segment between said first segment and said last segment and positioned above said light exposure region;

light blocking material extending from said lens segment to said portion of said base panel about said light blocking region; and whereby said plurality of segments are movable from a position substantially parallel to said base panel to an erected condition over said film exposure region with said lens disposed thereabove in preparation for exposure of film positionable in said film exposure region.

30. The collapsible camera of claim 29, further comprising:

A pair of inwardly directed pins respectively connected to opposing sides of said trailing edge of said last segment, and a pair of inwardly directed pins respectively connected to opposing sides of said leading edge of said first segment;

said first side edge and said second side edge respectively defining opposing longitudinal grooves running along respective portions thereof; said pairs of pins respectively slidably residing in said longitudinal grooves.

31. The collapsible camera of claim 29, further comprising:

attachment means for slidably engaging said first side edge and said second side edge of said base panel; and said leading edge of said first segment and said trailing edge of said last segment being connected to said attachment means.

32. The collapsible camera of claim 31, wherein said attachment means are transverse members having a transverse slot therethrough; said base panel slidably residing in said transverse slots.

33. The collapsible camera of claim 29, further comprising:

a first viewfinder aperture disposed through said lens segment; and a second viewfinder aperture disposed through said base panel and being substantially alignable with said first viewfinder aperture.

34. The collapsible camera of claim 29, further comprising:

means for controllably introducing light through said lens and into contact with said light exposure region.

35. The collapsible camera of claim 34, wherein said means for controllably introducing light is a shutter mechanism between a scene to be photographed and said light exposure region.

36. The collapsible camera of claim 29, wherein said light blocking material is tubular in configuration.

37. The collapsible camera of claim 29, further comprising:

A light sensitive medium disposed on said light exposure region.

38. The collapsible camera of claim 37, wherein said light sensitive medium is photographic film.

39. The collapsible camera of claim 37, wherein said light sensitive medium is a digital image capture device.

40. The collapsible camera of claim 29, wherein said collapsible camera is substantially the size of a credit card when said leading edge of said first segment is positioned proximal to said first end edge of said base panel and said trailing edge of said last segment is positioned proximal to said second end edge of said base panel.

41. The collapsible camera of claim 38, wherein said photographic film is 35 mm film.

42. The collapsible camera of claim 38, wherein said photographic film is an individual frame of film.

43. A collapsible camera, comprising:

a base panel having a first end edge and a second end edge opposing said first end edge and a first side edge and a second side edge;

a flexible panel having a leading edge and a trailing edge; said leading edge of said flexible panel being controllably movable along said base panel between said first end edge of said base panel and said second end edge of said base panel; said trailing edge of said flexible panel being controllably movable along said base panel between said first end edge of said base panel and said second end edge of said base panel;

said leading edge of said flexible panel being temporarily fixable to said base panel at a selected distance from said trailing edge of said flexible panel; said trailing edge of said flexible panel being temporarily fixable to said base panel at a selected distance from said leading edge of said flexible panel; a portion of said base panel under said flexible panel defining a light exposure region;

a lens disposed in said flexible panel;

light blocking material extending from said flexible panel to said portion of said base panel about said light blocking region; and whereby said flexible panel is movable from a position substantially parallel to said base panel to an erected condition over said film exposure region with said lens disposed thereabove in preparation for exposure of film positionable in said film exposure region.

44. The collapsible camera of claim 43, wherein said flexible panel is made of plastic.

45. The collapsible camera of claim 43, further comprising:

attachment means for slidably engaging said first side edge and said second side edge of said base panel; and said leading edge of said flexible panel and said trailing edge of said flexible panel being connected to said attachment means.

46. The collapsible camera of claim 45, wherein said attachment means are transverse members having a transverse slot therethrough; said base panel slidably residing in said transverse slots.

47. The collapsible camera of claim 43, further comprising:
- a first viewfinder aperture disposed through said flexible panel; and
- a second viewfinder aperture disposed through said base panel and being substantially alignable with said first viewfinder aperture.

48. The collapsible camera of claim 43, further comprising:
- means for controllably introducing light through said lens and into contact with said light exposure region.

49. The collapsible camera of claim 48, wherein said means for controllably introducing light is a shutter mechanism between a scene to be photographed and said light exposure region.

50. The collapsible camera of claim 43, wherein said light blocking material is tubular in configuration.

51. The collapsible camera of claim 43, further comprising:
- A light sensitive medium disposed on said light exposure region.

52. The collapsible camera of claim 51, wherein said light sensitive medium is photographic film.

53. The collapsible camera of claim 51, wherein said light sensitive medium is a digital image capture device.

54. The collapsible camera of claim 43, wherein said collapsible camera is substantially the size of a credit card when said leading edge of said flexible panel is positioned proximal to said first end edge of said base panel and said trailing edge of said flexible panel is positioned proximal to said second end edge of said base panel.

55. The collapsible camera of claim 52, wherein said photographic film is 35 mm film.

56. The collapsible camera of claim 52, wherein said photographic film is an individual frame of film.

* * * * *